Nov. 10, 1964    J. E. STRAUB    3,156,125
DETENT POSITIONING ROTARY SOLENOID
Filed Nov. 15, 1962    2 Sheets-Sheet 1

INVENTOR.
Joseph E. Straub
BY
ATT'Y.

United States Patent Office 3,156,125
Patented Nov. 10, 1964

3,156,125
DETENT POSITIONING ROTARY SOLENOID
Joseph E. Straub, El Segundo, Calif., assignor to Illinois Tool Works Inc., Chicago, Ill., a corporation of Delaware
Filed Nov. 15, 1962, Ser. No. 237,956
10 Claims. (Cl. 74—126)

This invention relates in general to an electromagnetically operated rotary actuator, and more particularly to a solenoid whose movable shaft is designed to provide rotary motion rather than linear motion and which is connected to a detent positioning device. This solenoid is an improvement to the torque solenoid of the type shown and described in my Patent No. 2,989,871, issuing June 27, 1961.

Rotary solenoids of the type under discussion essentially comprise a device having an electromagnet and an axially movable armature which is adapted to move linearly upon energization. This linear movement is then converted into rotary movement. The rotary movement is imparted by a cam roller mechanism and it is with an improvement in the output end of the rotary solenoid with which the instant invention is concerned.

More particularly, the instant device is concerned with utilizing the rotary output movement of a rotary solenoid with a detent positioning device integral with the end thereof. For example, it is often desirous to have a free running detent mechanism run by some exterior load in such a manner that the teeth on the detent mechanism are not exactly aligned in any of a plurality of desired positions. Consider an annular array of teeth, for example, eight in number, which may be rotated free of any detent so that it may assume any of an infinite number of positions upon free rotation thereof. There are many places where it is desired that the teeth end up in any one of eight precise positions and preferably will go to the closest position available after stoppage of the movement of the teeth. A problem in a mechanism of this type is a dead centering of the detent upon the top of a tooth. The instant mechanism is peculiarly well adapted to preventing any balancing of forces at any position other than the preselected position of the detent mechanism. The cam means associated with the armature and electromagnet is adapted to provide a coupling roller with helical movement (utilizing both an axial and a rotative movement simultaneously) so that the roller is adapted to engage the detent teeth so as to precisely position the mechanism in a preselected position.

It is a general object of this invention to provide a precise, compact, relatively simple mechanism of great reliability and ruggedness as well as of exceedingly high precision and durability.

It is a further object of this mechanism to provide a device for accurately positioning a rotative member in any one of any number of preselected locations independent of the initial position thereof.

It is a further object of this invention to provide a device which is adapted to have a free running component having teeth thereon which are engageable with an armature of a rotary solenoid in such a manner that accurate positive location of the free running member is obtained upon stoppage of the rotation thereof.

While this invention will be discussed in terms of a rotary solenoid and detent mechanism adapted to be associated with a counter, it is obvious that there are many other usages available, and thus, the precise use to be explained is to be considered illustrative rather than limiting.

The novel features that are considered characteristic of this invention are set forth with particularity in the appended claims. The invention itself, however, both as to its organization and its method of operation, together with additional objects and advantages thereof will be best understood by the following description of the specific embodiment when read in connection with the accompanying drawings in which:

Figure 1:
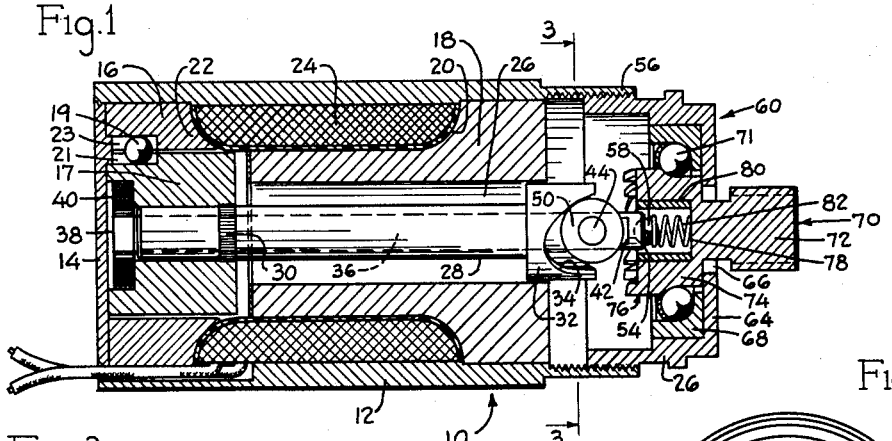
FIG. 1 is a longitudinal sectional view showing the relative position of the parts in deenergized position.

The rotary solenoid device 10 depicted in FIG. 1 is a high precision device and is shown in an enlarged scale for pictorial clarity. In practice, the device may have a size of approximately three-quarters of an inch diameter and slightly less than two inches overall length. The device 10 essentially comprises an outer tubular casing or housing 12 having an end plate 14 fixedly mounted to one end. An annular insert 16 is asosciated with the end 14 and has an internal bore coaxial with the axis of the housing to mount the movable armature 17. The insert 16 also serves as a part of the magnetic flux path and the bore therein has a plurality of channel shaped slots or grooves 23 cooperating with complementary slots or grooves 21 in the armature 17 to provide a race-way for receipt of suitable ball bearings 19 which permit axial movement of the armature 17 while preventing rotational movement thereof.

An annular core piece 18 is fixedly mounted to the housing 12 and has a necked down portion 20 which, together with necked down portion 22 of insert 16, provides a recess for receipt of electromagnet coil windings 24 having suitable terminals extending for connection to a suitable source of electrical current (not shown). Core piece 18 is provided with a bore 26 concentric with the axis of the solenoid. Energization of core 24 causes movement of armature 17 along the axis in conventional fashion, the armature being restrained against rotary motion by the ball bearing 19 and the complementary keyways or slots 21 and 23.

An elongated tubular member 28 is fixed to the armature 17 by a suitable knurled force fit relationship at 30 so as to mount the member 28 for movement with the armature. Tube member 28, at the end thereof opposite from portion 30, is formed with an enlarged tubular portion 32. Portion 32 is formed to provide a pair of symmetrically disposed crown cam portions 34 for purposes hereinafter appearing. It will be recalled that tube member 28 is operable for axial movement but is restrained by virtue of balls 19 from rotatable movement and thus the cams 34 are operable to move in an axial plane only.

A shaft means 36 is disposed inside of the tube means 28, said shaft means having an axial length greater than the length of the tube means 28. One end 38 of shaft means 36 is fixedly attached to a spring means 40, the latter being attached at its other end to the armature 17. The spring means 40 permits relative axial and rotational movement, to a limited degree, of the shaft means 36 relative to the armature 17 and the tube means 28. The spring 40 is so arranged relative to the shaft 36 and the the armature 17 that shaft 36 is, upon deenergization of the magnet coil means 24, returned to a stabilized position where the roller means is disposed in a predetermined relationship to the cam means as shall be explained hereinafter.

Shaft 36 is formed with a pair of flat portions 42 adjacent the end 54 opposite to end 38. A transverse cross shaft 44 is fixedly mounted through the opposed flats in the area 42 of shaft 36 to mount four rollers 46, 48, 50 and 52. These rollers are preferably high precision ball bearing rollers and the inner pair 46-48 of rollers are respectively adapted to engage the crown cams 34 on the extension 32 of tube 28 attached to the armature. The outboard pair of rollers 50-52 together with the inboard rollers 46-48 act as a coupling means for translating the axial solenoid movement of the armature 17 into movement of the output means as shall be explained.

A removable end portion 60 of the apparatus is threadedly attached to an extension of the housing 12 (as shown in FIG. 1) by suitable complementary threads 56. More particularly, the end portion 60 comprises a hollow cup-shaped member having a bottom portion 64 with an aperture 66 centrally formed therein for receipt of the output shaft means 70. A bearing insert 68 is disposed adjacent the bottom 64 to provide a portion of the race-way for the output shaft means 70. Suitable conventional ball bearing means 71 is disposed adjacent the insert 68 and the output shaft means 70 as shown.

The output shaft means 70 is in the form of a first portion 72 having a plurality of spur gear teeth on the periphery thereof for engagement with other mechanisms not shown. It will be noted that portion 72 is outside of the casing. Concentric with aperture 66 and concentric with the axis of the solenoid is the enlarged internal second portion 74 of the output shaft means. The second portion 74 essentially comprises a hub shaped member which is rotatable on the ball bearing 71 having an annular array of teeth 76 which are formed in portion 74 at right angles to the direction of extension of the teeth of the spur gear portion 72. A bore 78, concentric with the annular array of teeth 76, is formed in the output shaft means second portion 74. An annular wear insert 80 may be disposed in the bore as suitable and desired. A biasing spring 82 is disposed in the bore 78 and bottoms on the bottom thereof to apply a bias on the end 54 of shaft 36 through a ball 58 to make sure that the rollers 50 and 52 clear the tops of the annular array of teeth 76. The ball bearing 58 assures that relative rotation between the end of the shaft 54 and the spring 82 is easily obtained.

Figure 3:
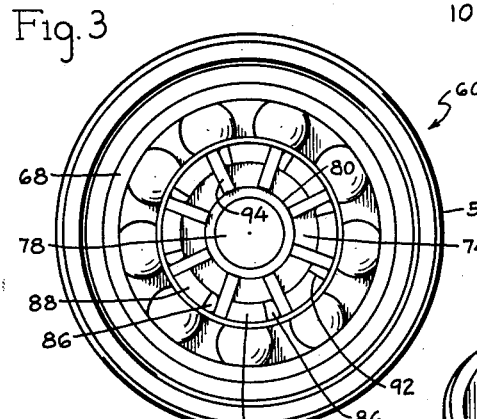
FIG. 3 is a view of the right hand end portion of the assembly shown in FIG. 1, said view being taken along lines 3—3 of FIG. 1 when the part is in detached relationship.
Figures 2, 4, 9:
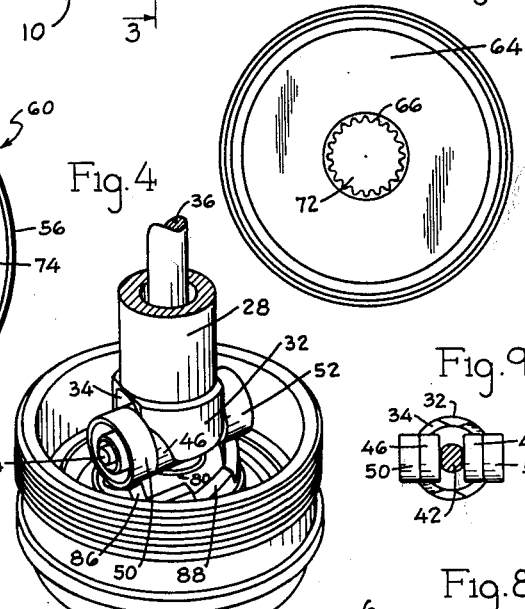
FIG. 2 is an end view from the right hand end of FIG. 1 along lines 2—2 thereof.
FIG. 4 is a perspective view of the end portion shown in FIG. 3 with the roller and cam assembly in cooperation therewith.
FIG. 9 is a sectional view taken along lines 9—9 of FIG. 5.
Figure 6:
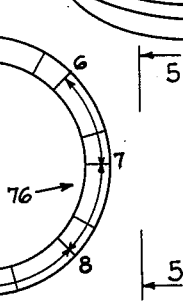
FIG. 6 is a schematic view of the parts shown in FIGS. 4 and 5.
Figure 7:
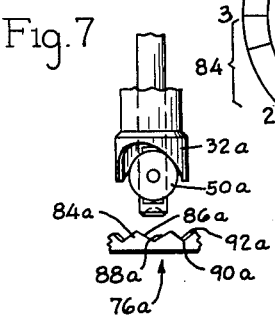
FIG. 7 is a semidiagrammatic view similar to FIG. 5 showing an alternate embodiment of teeth on the detent mechanism.

The individual teeth 84 of the annular array of teeth 76 are preferably symmetrically disposed a predetermined spacing from the axis of the output shaft means 70 so as to be aligned for engagement with the outboard rollers 50 and 52 on shaft 36. The individual teeth 84 have a thickness dimension such that the internal diameter of the annular array of teeth 76 is slightly greater than the outer diameter of portion 32 of the tube means 28. The individual teeth 84 of the anular array of teeth 76 are formed with two surfaces 86-88 which converge to form a point 92, adjacent teeth having a valley 90 therebetween. As shown in FIG. 3, due to the extremely small size of the teeth, and for manufacturing convenience, the valleys 90 may in fact be flats 94 which are ground in the areas of the valley 90 of the teeth solely for manufacturing convenience. The valleys 90 or 94 of the teeth 84 are not active surfaces in cooperation with the roller and since it is easier to grind flats 94 in this area than to final form the teeth, as shown in FIGS. 6, 7 and 10, the construction shown in FIG. 3 may be adopted.

Figure 5:
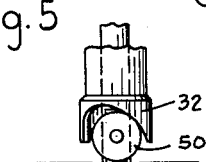
FIG. 5 is a semidiagrammatic view of the cooperating roller and detent teeth mechanism axially spaced for pictorial clarity.
Figure 8:
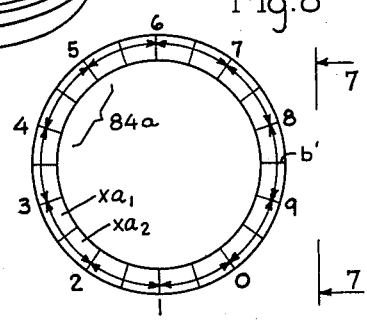
FIG. 8 is a schematic view similar to FIG. 6 relating to the mechanism shown in FIG. 7.

FIG. 5 is diagrammatic in the sense that the teeth 76 and the roller 50 are shown spaced apart a considerably greater distance than obtains when the device is in final assembled position. However, the relative size relationship of the parts is in the correct range of magnitude for the particular movements desired. As shown in FIG. 6, which is a diagrammatic presentation of the annular array of teeth 76, there are eight teeth symmetrically spaced from each other, each substantially identical. An alternate array of teeth and cooperative rollers are shown in FIGS. 7 and 8, similar parts being shown with similar reference numerals with the addition of the suffix $a$. In the array shown in FIGS. 7 and 8 there are 10 teeth. It will be noted in the embodiment shown in FIGS. 1 through 6, that the individual teeth 84 are asymmetrical, the slope of surface 86 being considerably steeper than the slope of surface 88. The design of the individual teeth can be varied to suit, depending upon the output characteristics desired.

Figure 10:
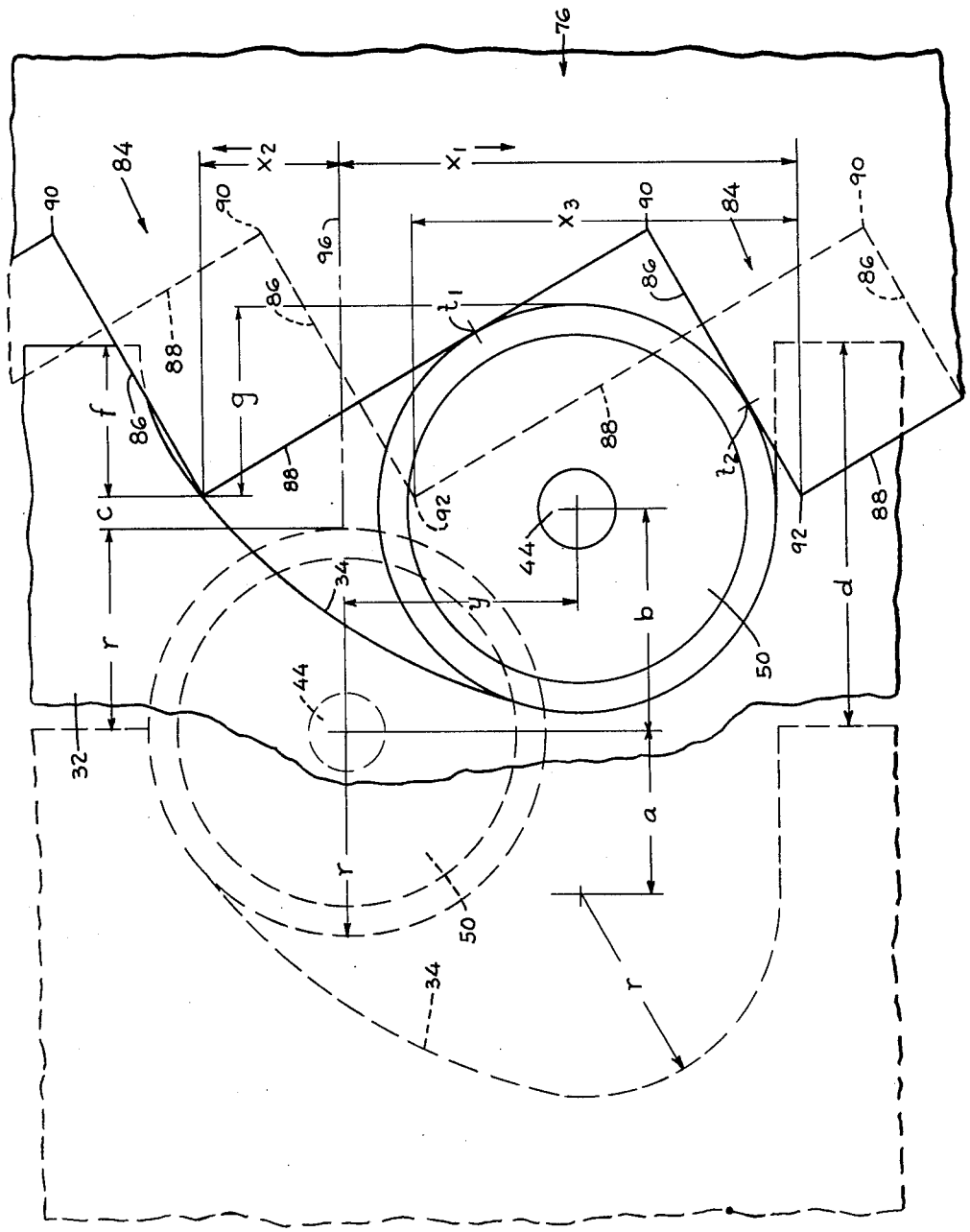
FIG. 10 is a greatly enlarged fragmentary view indicating the relative position of certain parts prior to energization to afford movement of the output shaft.

FIG. 10 is a greatly enlarged somewhat diagrammatic showing indicating the relative movement of the parts upon energization of the coil 24. The dotted position of the parts shown in the left hand portion of FIG. 10 indicate the initial position when the parts are deenergized. More particularly, the roller 50 has a radius $r$ and may have an initial position relative to the cam so that the axis of the shaft 44 is coplanar with the ends of portion 32 of the tube means 28. Thus, the roller 50 extends beyond the right hand extremity of the portion 32 a dimension $r$. For purposes of illustration, it will be assumed that the teeth 84 are in the dotted line position shown in the right hand portion of FIG. 10. Upon energization of the coil, the armature 17 causes the tube 28 and thus portion 32 to move to the right a dimension $d$. The tips 92 of the teeth 84 are initially spaced a dimension $c$ (on the order of .002 inch) from the roller 50. As the portion 32 starts its axial movement, shaft 44 and hence roller 50, initially will move along a path indicated by construction line 96. As soon as the roller 50 has moved a dimension $c$, it may encounter a portion of the tooth 84. The tip 92 of an individual tooth 84 will be initially located either above, below or on construction line 96. If the tooth 84 is initially located as shown in FIG. 10 by the dotted line portion, it will move a distance $x_3$ (downward as viewed in FIG. 10) to the full line position indicated in the right hand portion of the drawing. Upon the roller 50 engaging some portion of the tooth 84, the roller will, because of the resistance to further motion, move along cam surface 34 unil it bottoms on the recessed portion of the cam as shown in the full line position, simultaneously causing the tooth 84 and thus the annular array of teeth 76 to move to a predetermined position. A tooth 84 of the eight teeth in array 76 will always end up in the position shown in full line in FIG. 10. If the tooth to be engaged is at any other position other than the dotted position at the start of energization, and depending upon whether the point lies on the upper side of line 96 or on the lower side of line 96, it will travel correspondingly a dimension in a counterclockwise or clockwise direction, indicated diagrammatically by the dimensions $x_1$ and $x_2$ which are indicative of the range of movements in both directions. The roller 50, upon energization of the coil 24, has an axial component of movement a dimension $b$ from the initial position, the dimension $a$ being the amount of relative axial movement of portion 32 to the roller 50 to allow the roller to bottom on cam 34. Dimension $g$ represents that portion of movement of the rollers in the axial direction from the point of first possible engagement with the teeth 84 to the full line position where it is tangent to the two surfaces 88 and 86 at tangency points $t1$ and $t2$, as shown in full line and $f$ represents the movement of portion 32. Roller 50 has a radial component of movement indicated by the reference numeral $y$. It will be obvious in the particular geometry of teeth, cam and roller shown in FIG. 10, that $a+b=d$; $f+c=b$; $r+c+g=a+b$; and $r+c+f=d$. It will be further noted that for the geometry involved, it is assumed that rollers 46 and 48 are of the same diameter as rollers 50 and 52, although this may be varied in actual design if desired. Further, the diameter of portion 32 at the end of the tube is less than the inner diameter of the annular array of teeth so that portion 32 does not interfere with free rotation of the output shaft means 70 as determined by the cooperation of the rollers 50–52 and the teeth 76. It will be further realized that in order to have a stable, repetitive operation of the mechanism, so that any of a plurality of positions is obtained upon repeated cyclings of the device, it is necessary that the rollers 50–52 always bottom on the two tooth surfaces 86 and 88 and the cam surface 34 as shown in the right hand full line portion of FIG. 10. Thus, the magnetic attractive force of the coil on the armature 17 and the dimensions of the parts must be such as to exert an axial bias on the portion 32 in the right hand direction as viewed in FIG. 10 when the magnet is energized and when the parts are in the full line position shown. Spring 78, upon deenergization, assures that the roller 50 returns to a position where it clears the top of the teeth by a suitable dimension $c$ and spring 40 assures that the starting position of the rollers 46–52 is maintained relative to the cam surface 34 upon deenergization of the coil.

It will be observed, that while at times one roller 50 has been discussed, that in point of fact, there are two symmetrically disposed rollers 50–52 which cooperate with opposed teeth 84 and there are two rollers 46 and 48 cooperating with two symmetrically arranged cam surfaces 34 and thus all statements relative to the individual respective rollers also apply to their complementary rollers.

It will be further observed that it is possible to arrange the geometry of the teeth cam and roller in such a manner that $x_1$ and $x_2$, which indicate the amount of counterclockwise and clockwise rotation of the annular array of teeth may be so arranged that $x_1$ and $x_2$ are equal (see FIGS. 7 and 8). It will be further observed that depending upon the size of the rollers and the size and geometry of the teeth involved, that it is possible to provide a mechanical arrangement such that there are ten positions such as shown in FIG. 7, whereby if the output shaft means 70 is in position, for example, 1.4, the energization of the device will cause the output shaft to return to position one. If the initial position of the teeth is such as to have the output shaft means stop at 1.55, then the array of teeth will move to position two. There are various counter mechanisms where the functions of free rotation of the individual output shaft 70 is desired and movement to the closest whole digit position upon stopping. The instant arrangement, it will be seen, is well adapted to positively place the output shaft in any of a plurality of predetermined desired positions under these circumstances.

It will be particularly observed, that the instant device prevents the roller 50 from being hung up on the tip 92 of an individual tooth 84. This obtains since the rollers 50–52 have both an axial component of movement $b$ and a radial component of movement $y$. When the roller engages the top of the tube 92 when it is initially located on line 96, the roller will topple to one or the other sides of the individual tooth, causing it to move in direction $x_1$ or direction $x_2$. This is particularly important in those applications where reliability is of extreme importance.

Due to the arrangement and geometry of the parts, the instant device is very rugged, can withstand a great deal of vibration, sudden accelerations and decelerations, and a wide variety of environments.

Although specific embodiments of the invention have been shown and described, it is with full awareness that many modifications thereof are possible. The invention, therefore, is not to be restricted in interpretation, except in so far as is necessitated by the prior art and by the spirit of the appended claims.

I claim:

1. A torque solenoid of the character described comprising a coil adapted to be energized by an electric current, a core fixedly mounted within said coil, an armature normally axially spaced from said core and aligned therewith and nonrotatably linearly moveable to said core upon energization of said coil, magnetic circuit means completing a magnetic circuit from said core, around said coil to said armature, a shaft extending through said core rotatably about its axis and operable for limited simultaneous rotational and axial movement, roller means on said shaft, cam means connecting said armature to said rollers means on said shaft, said cam means comprising a crown cam acting to convert linear movement of said armature to a helical motion that is applied to said shaft, and output means converting said helical motion to rotary motion.

2. An indenting torque solenoid comprising selectively energizable magnetic means, armature means movable in the first direction upon energization of said magnetic means and including cam means, first shaft means extending through said armature means having means engageable with said cam means for translating said movement in a first direction to helical movement having an axis parallel to said first direction, output shaft means normally disconnected from said first shaft means when said magnetic means is deenergized, and rotary means associated with said output shaft means engageable with said first shaft means upon energization of said magnetic means to selectively rotate said output shaft means to one of a plurality of predetermined positions independent of the relative locations of said output shaft means to said cam means at the time of said energization.

3. A mechanism comprising selectively energizable magnetic means, armature means movable in the first direction upon energization of said magnetic means and including cam means, coupling means associated with said cam means for translating said movement in said first direction to helical movement having an axis parallel to said first direction and output means normally disconnected from said coupling means when said magnetic means is deenergized and engageable with said coupling means upon energization of said magnetic means to utilize said helical movement.

4. A torque solenoid of the character described comprising a coil adapted to be energized by an electric current, a core fixedly mounted within said coil, an armature normally axially spaced from said core and aligned therewith and nonrotatably linearly movable to said core upon energization of said coil, magnetic circuit means completing a magnetic circuit from said core, around said coil to said armature, a shaft extending through said core rotatably about its axis and operable for limited simultaneous rotational and axial movement, first and second roller means on said shaft, cam means connecting said armature to said first roller means on said shaft, said cam means comprising a crown cam acting to convert linear movement of said armature to a helical motion that is applied to said shaft, and output means associated with said second roller means converting said helical motion to rotary motion.

5. An indenting torque solenoid comprising a housing containing selectively electrically energizable magnetic means, armature means axially movable in the first direction upon energization of said magnetic means and including cam means, first shaft means extending through said armature means including transverse shaft means having first roller means mounted thereon engageable with said cam means for translating said axial movement in a first direction to helical movement having an axis parallel to said first direction, second roller means mounted on said transverse shaft means, output shaft means normally disconnected from said second roller means when said magnetic means is deenergized, said rotary means associated with said output shaft means engageable with said second roller means upon energization of said magnetic means to selectively rotate said output shaft means to one of a plurality of predetermined positions independent of the relative locations of said output shaft means to said cam means at the time of said energization.

6. The solenoid set forth in claim 5 wherein said transverse shaft means is fixedly mounted on said first shaft means and said first roller means comprises a pair of rollers symmetrically spaced from said axis with each engageable with the cam means and said second roller means comprises a pair of rollers each of which is disposed on said transverse shaft means radially outboard of said first roller means.

7. The mechanism set forth in claim 6 wherein said output means comprises a first portion external to said housing and a second portion internal of said housing connected to said first portion, said second portion comprising a plurality of teeth concentric with the axis of said first shaft means and said first portion of said output shaft means, said second roller means being engageable with said teeth of said second portion to position said first portion to one of a number of positions independent of the relative position of a particular tooth upon energization of said magnetic means.

8. A mechanism set forth in claim 7 wherein said second portion of said output shaft means comprises an annular array of teeth having an inner diameter larger than the greatest dimension between the symmetrically spaced pair of rollers making up said first roller means.

9. The mechanism set forth in claim 8 wherein said first shaft means has first and second spaced end portions, said transverse shaft means being mounted intermediate the first and second end portions of said first shaft means, said output shaft means second portion including a bore for receiving said first end portion of said first shaft means, and biasing means located in said bore engageable with said first end portion and operable upon deenergization of said magnetic means to return said first shaft means and the rollers mounted on said transverse shaft means to a position spaced from contact with said toothed second portion of said output shaft means whereby said output shaft means may be rotated independent of said roller means when said magnetic means is deenergized.

10. The mechanism set forth in claim 9 wherein said individual teeth of said annular array of teeth on said second portion of said output shaft means each have first and second converging surfaces extending in a direction generally parallel to the axis of said solenoid, said second roller means upon energization of said magnetic means being initially engageable with one of said first and second surfaces or the point of convergence of said first and second surfaces of an individual tooth in array of teeth, said first portion of said output shaft means rotating in a counterclockwise direction upon initial engagement of said second roller means with said first tooth surface, said first portion of said output shaft means rotating in a clockwise direction upon initial engagement of said second roller with said second tooth surface, and dead centering of said second roller means on said point of convergence of said first and second surfaces being prevented by helical movement of said second roller means.

References Cited by the Examiner

UNITED STATES PATENTS

| | | | |
|---|---|---|---|
| 2,396,040 | 3/46 | Darling | 74—126 |
| 2,804,778 | 9/57 | Booth | 74—125.5 |
| 2,936,635 | 5/60 | Adams | 74—99 XR |
| 2,959,969 | 11/60 | LeLand | 74—88 |
| 2,963,915 | 12/60 | Straub | 74—128 XR |
| 2,989,871 | 6/61 | Straub et al. | 74—99 |
| 3,073,995 | 1/63 | Phinlzy | 74—88 XR |
| 3,111,854 | 11/63 | Drillick | 74—126 |
| 3,136,930 | 6/64 | Straub | 317—192 |

FOREIGN PATENTS 920,334   3/63   Great Britain.

BROUGHTON G. DURHAM, *Primary Examiner.*